(12) United States Patent
Fetkovich

(10) Patent No.: US 7,088,823 B2
(45) Date of Patent: Aug. 8, 2006

(54) SYSTEM AND METHOD FOR SECURE DISTRIBUTION AND EVALUATION OF COMPRESSED DIGITAL INFORMATION

(75) Inventor: John E. Fetkovich, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/043,369

(22) Filed: Jan. 9, 2002

(65) Prior Publication Data

US 2003/0131251 A1    Jul. 10, 2003

(51) Int. Cl.
*H04K 1/00* (2006.01)
(52) U.S. Cl. .............. 380/255; 380/201; 380/217; 380/229; 380/230; 380/232; 726/30; 726/31
(58) Field of Classification Search ............... 380/255, 380/200, 201
See application file for complete search history.

(56) References Cited

U.S. PATENT DOCUMENTS

| | | | |
|---|---|---|---|
| 5,133,079 A | 7/1992 | Ballantyne et al. | |
| 5,504,816 A | 4/1996 | Hamilton et al. | |
| 5,796,826 A * | 8/1998 | Park | 380/203 |
| 5,822,360 A * | 10/1998 | Lee et al. | 375/140 |
| 5,889,860 A * | 3/1999 | Eller et al. | 705/51 |
| 5,915,018 A | 6/1999 | Aucsmith | |
| 5,963,909 A * | 10/1999 | Warren et al. | 705/1 |
| 5,991,399 A * | 11/1999 | Graunke et al. | 380/279 |
| 6,041,316 A * | 3/2000 | Allen | 705/52 |
| 6,119,233 A | 9/2000 | Hawkins | |
| 6,158,010 A | 12/2000 | Moriconi et al. | |
| 6,163,844 A * | 12/2000 | Duncan et al. | 713/201 |
| 6,229,894 B1 * | 5/2001 | Van Oorschot et al. | 713/150 |
| 6,256,733 B1 * | 7/2001 | Thakkar et al. | 713/156 |
| 6,286,100 B1 * | 9/2001 | Morimoto et al. | 713/176 |
| 6,363,480 B1 * | 3/2002 | Perlman | 713/164 |
| 6,442,276 B1 * | 8/2002 | Doljack | 380/51 |

(Continued)

FOREIGN PATENT DOCUMENTS

JP    10233066 A    9/1998

(Continued)

OTHER PUBLICATIONS

Herre et al, Compatible Scrambling of Compressed Audio, 1999, IEEE, pp. 27-30.*

(Continued)

*Primary Examiner*—Christopher Revak
*Assistant Examiner*—Aravind K Moorthy
(74) *Attorney, Agent, or Firm*—Whitham, Curtis, Christofferson & Cook, PC; William H. Steinberg

(57) ABSTRACT

A method for controlling access to digital information is performed based on a plurality of decryption keys sent by the information provider. A first type of decryption key instructs a user's host system to reproduce the digital information in accordance with a first level of reproduction quality degradation. Additional keys may specify other degradation levels. The quality of the digital information may be degraded based on a time condition or a use condition. Alternatively, only a portion of the information may be made viewable by a user. In order to obtain full and unrestricted access, the user must obtain a type of decryption key from the provider which removes all previous limitations on reproduction quality degradation.

21 Claims, 7 Drawing Sheets

U.S. PATENT DOCUMENTS

| | | | |
|---|---|---|---|
| 6,584,046 B1 * | 6/2003 | Oshima et al. | 369/13.31 |
| 6,598,164 B1 * | 7/2003 | Shepard | 713/189 |
| 6,643,402 B1 * | 11/2003 | Okada | 382/232 |
| 6,715,079 B1 * | 3/2004 | Maytal et al. | 713/194 |
| 6,728,379 B1 * | 4/2004 | Ishibashi et al. | 380/278 |
| 6,744,891 B1 * | 6/2004 | Allen | 380/231 |
| 6,874,085 B1 * | 3/2005 | Koo et al. | 713/165 |
| 6,889,327 B1 * | 5/2005 | Inoha | 713/193 |
| 6,898,708 B1 * | 5/2005 | Hori et al. | 713/171 |
| 6,904,527 B1 * | 6/2005 | Parlour et al. | 713/189 |

FOREIGN PATENT DOCUMENTS

| | | |
|---|---|---|
| JP | 11127153 A | 5/1999 |
| WO | WO 9900977 A1 * | 1/1999 |
| WO | WO 0203385 A1 * | 1/2002 |

OTHER PUBLICATIONS

Entertainment Editors, ASCARON Software to Protect PC Tiles with Macrovision's SafeDisc, 2001, Business Wire, p. 1.*

Zhang et al, Embedding Watermark in MPEG Video Sequence, 2001, IEEE, pp. 535-540.*

Stytz et al, Software Protection: Security's Last Stand?, 2003, IEEE, pp. 95-98.*

IBM Technical Disclosure Bulletin, "Public-Key Enciphering/Deciphering Transformations Using A Conventional Algorithm", vol. 25 No. 3A Aug. 1982.

IBM Technical Disclosure Bulletin, "Image-Based Security System Application", vol. 32 No. 4B Sep. 1989.

* cited by examiner

SYSTEM AND METHOD FOR SECURE DISTRIBUTION AND EVALUATION OF COMPRESSED DIGITAL INFORMATION

BACKGROUND OF THE INVENTION

1. Field of the Invention

This invention generally relates to the encryption of digital information, and more particularly to a system and method for controlling access to encrypted audiovisual, textual, and other digital information on a host computer system. The invention is also a business method based on this access control method.

2. Description of the Related Art

The ubiquitous appeal of computer networks has greatly simplified the dissemination of information. Through the internet, for example, digital images, movies, and text-based files can be downloaded to host computer systems in mere seconds. The availability of this information has spawned entire industries dedicated to compression technologies for making these downloads faster and more efficient, encryption technologies for making them more secure, and e-business technologies for selling information to consumers.

The implementation of these e-business practices is not without problems. One significant problem focuses on providing information to customers in a way that allows the e-business to make a profit. A typical scenario involves a company which provides JPEG or MPEG files to the public. These files may be personalized to the user. For example, the business may have acquired image files of a customer's newborn baby while at the hospital. Now, the business seeks to sell these pictures. Employing conventional methods, the business may send one of the images to the customer as a promotional incentive. This approach is undesirable because if the customer does not make a purchase, the business has essentially given the customer an image free of charge.

Other conventional techniques involve making a non-downloadable sample picture available on a website secured by a dated password, i.e., the customer may view the image on the provider's website using a password that is operative for a limited period of time. This approach requires a great deal of effort by the business and is not secure because, while the file may not be in downloadable form, the customer may still obtain the images free by capturing bitmaps of them. Further, such an approach is vulnerable to skilled hackers who have the ability to breach the security provided by the password scheme.

In view of the foregoing considerations, it is clear that there is a need for an improved system and method for controlling a user's access to digital information, and moreover one which provides access to at least a sample of the digital information without compromising the ability of the business to make a profit. There is a further need of providing such a system and method with tamper-resistant features and which operates in a manner which enhances convenience to both the user and provider.

SUMMARY OF THE INVENTION

It is one object of the present invention to provide a system and method which more effectively and securely controls access to digital information on a host system than conventional methods, and moreover one which performs this control through a marketing strategy that does not compromise business profitability, which enhances convenience both to the user and information provider, and further which employs tamper-resistant features to protect the integrity of the system.

It is another object of the present invention to achieve the aforementioned object by providing an application program which degrades reproduction quality of the digital information over time or based on a number of uses at the host system, or which restricts access to only a portion of the digital information when reproduced on the host system.

It is another object of the present invention to provide a system and method which controls access to digital information in accordance with a plurality of decryption keys, wherein one key causes the digital information to be reproduced by a media player application with degraded quality and another key, subsequently received, causes the digital information to be reproduced without quality degradation.

It is another object of the present invention to provide a business method wherein any or all of the aforementioned forms of reproduction quality degradation are performed to provide customers with restricted and/or temporary access to the digital information, thereby providing an incentive to users to pay for permanent access and ownership of the information. This system and method simultaneously protects the digital information provider's business interests should users decide not to purchase the information.

The foregoing and other objects of the invention are achieved by providing a system and method wherein a media provider acquires digital information of interest to at least one user of a host system. The digital information may be any type including one or more image, audiovisual/movie, and/or text files. These files may be personally related to the user or be of more general appeal. In order to encourage the user to buy the information, the media provider takes steps to ensure that the user has only temporary or partial access to the information when reproduced on the host system. This access control is performed based on a plurality of types of decryption keys sent from the provider to the user, and a media player application which is able to recognize each type of decryption key sent from the provider.

In accordance with the present invention, each of the keys performs two functions. First, each key decrypts the digital information. Second, each key controls host system software (which may be the media player application or some other program) to effect a different level and/or type of reproduction quality degradation on the media player. The level and type of reproduction quality degradation may be controlled by a time condition or a use condition. In addition, or alternatively, reproduction may be limited to only a portion of the digital information sought by the user. To control reproduction quality in this manner, the media player application preferably accesses a table of information which correlates each of the types of decryption keys with a certain reproduction quality. For example, a first type of decryption key may be sent from the provider which instructs the host system to progressively degrade the reproduction quality of the digital information for each viewing. A second type of key may instruct the host system to allow viewing to take place a predetermined number of times only. Still another type of key may instruct the host system to display only a portion of the information.

When the user of the host system has decided to purchase the digital information from the provider, the provider sends another key which allows the digital information to be viewed in its entirety and without degradation. This key further provides the user with permanent, unrestricted access to the information, thereby allowing the user to make copies if desired. To protect the system and method from being compromised by hackers, the host system may be equipped with tamper-resistant software. Also, for convenience purposes, the digital information may be sent to users through a network with the media player application. Under these circumstances, the digital information would advantageously be tied to the media player, with an initial decryption key embedded for controlling reproduction quality degradation.

DESCRIPTION OF THE PREFERRED EMBODIMENTS

The present invention is a system and method for controlling the access to and reproduction of encrypted digital information on a host system. The present invention is also a business method for marketing and selling digital information to customers based on the access and reproduction control method. The present invention is also a computer-readable medium incorporating information for controlling the access to and reproduction of digital information in accordance with the invention.

Overview of System and Method

Figure 1:
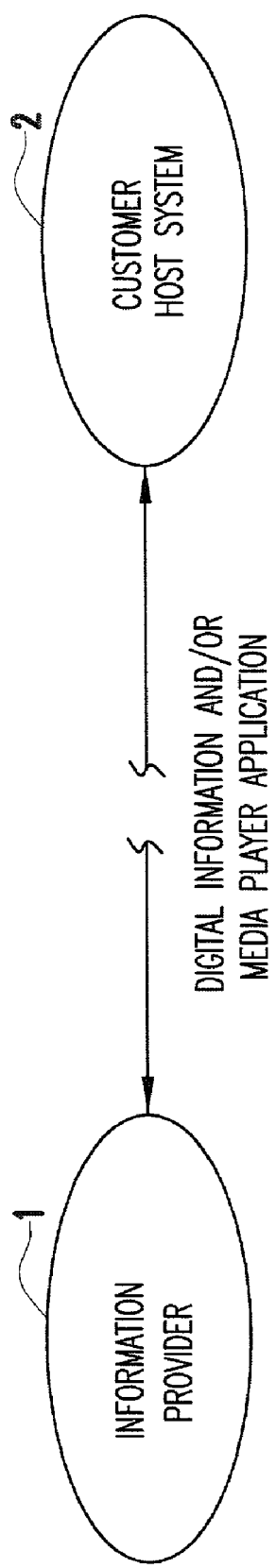
FIG. 1 is a diagram showing one context in which the system and method of the present invention may be implemented for controlling access to digital information.

Referring to FIG. 1, one embodiment of the method of the present invention for controlling the access to and reproduction of digital information is implemented between a provider 1 and a host system 2. The provider may be an entity (e.g., business or individual) possessing or having access to equipment and software for encrypting digital information in accordance with the present invention. The provider may also be the one who originally acquired the information although acquisition is optional, i.e., the digital information intended for encryption may have been acquired by a third party who subsequently sent the information to the provider.

Once acquired and encrypted, the digital information is conveyed to a user of the host system. The digital information may be sent to the user, for example, over a network as an attachment to an e-mail or as a streamed computer file. Alternatively, the information may be stored on a computer-readable medium (e.g., a floppy disk, compact disk, DVD-RAM disk, etc.) delivered to the user. Other conventional methods of conveyance are also possible. Preferably, the digital information is conveyed with a decryption key. However, alternative embodiments of the invention contemplate remote or separate access of decryption data.

The host system may be a personal computer, a digital set-top box for a television, a personal digital assistant/handheld computer, or other microprocessor- or chip-based device capable of receiving, decrypting, and then reproducing digital information. In order to reproduce the digital information, the host system preferably stores or has access to an appropriate application program. For example, if the digital information is an image file, a viewer application may be stored. If the information is audiovisual in nature, a movie player application may be stored. And/or, if the information is an electronic text file the application may be a compatible word processing or other text-display program. The information may also be music or even software. The host computer system is preferably connected to the provider through a network, which may be of any type including fiber-optic and wireless in addition to conventional landlines.

Figure 2:
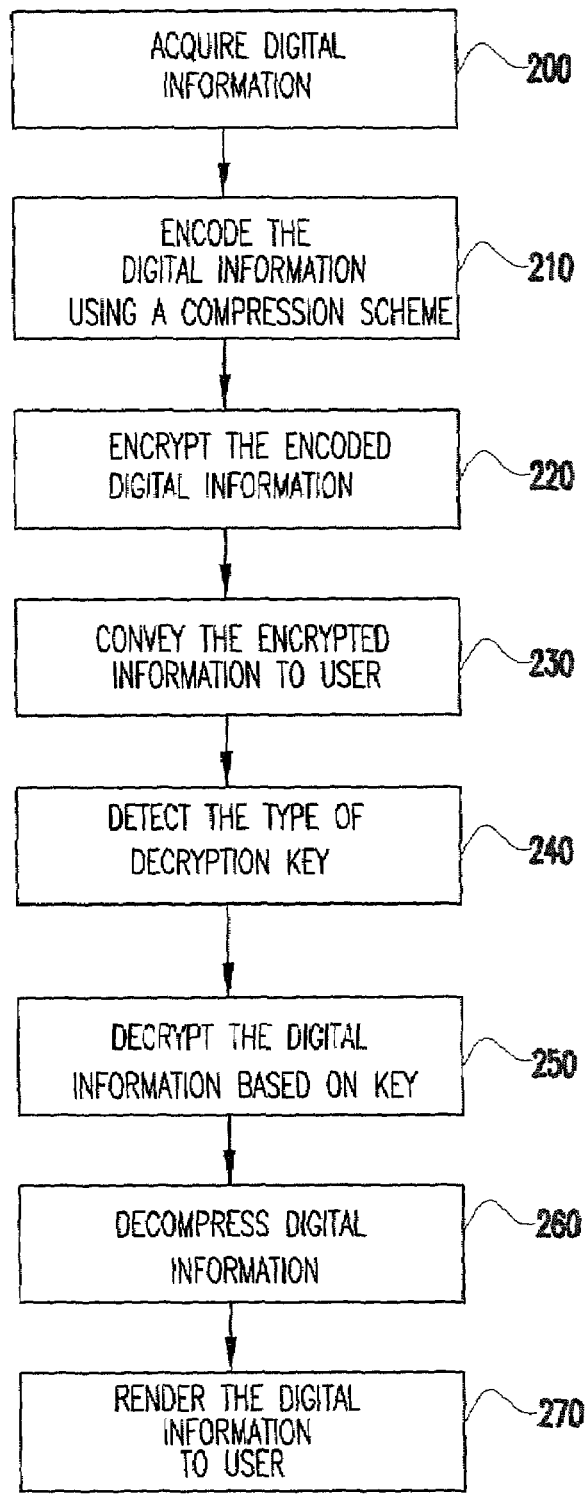
FIG. 2 is a flow diagram showing steps included in one embodiment of the method of the present invention.

FIG. 2 shows in diagrammatic form a summary of steps included in a preferred embodiment of the method of the present invention, as implemented between the provider and host system of FIG. 1. As shown, in implementing the method the provider first acquires digital information to be sent to the host system. (Block 200). As previously discussed, the provider can capture and/or generate the digital information himself or may obtain this information from a third party.

Second, the digital information is encoded using a compression scheme. (Block 210). If the digital information is in the form of audiovisual data, MPEG compression may be used. If the information is image data, JPEG compression may be used. One skilled in the art can appreciate that these specific compression schemes are merely illustrative of the claimed invention, as other compression techniques may also be implemented. For example, if the digital information is in the form of a document or text file, the ZIP compression scheme may be used. The information may also be a music file in compressed digital form.

Third, the encoded digital information is encrypted. (Block 220). In accordance with the present invention, encryption is performed in a way which allows the digital information to be decrypted using more than one type of decryption key. The manner in which encryption may be performed is described in greater detail below.

Fourth, after the compression and encryption steps, the digital information is conveyed to the host system preferably with one of a plurality of decryption keys. (Block 230). Sending the decryption key with the digital information is an optional but preferred step. Another optional but preferred step includes conveying an application program for reproducing the digital information with the digital information and key. If the digital information contains audio-visual data or a music player such as an MP3 player, the application program may be a media player. Alternatively, if the digital information includes textual information, the application may be a text reader such as Adobe Acrobat Reader. If the application is conveyed with the digital information, the decryption key may be embedded within the application for convenience purposes; however, the application may be kept separate from the key if desired.

The decryption keys and/or application program may be obtained from a source other than the provider. For example, a user at the host system may acquire a media player application from a third-party website. The host system user may then use this media player to reproduce the digital information sent from the provider.

In order to reproduce the digital information sent from the provider, the host system is preferably configured to include at least a processor and a memory unit. The memory unit stores predetermined data that enables the processor to control the reproduction of the digital information based on the type of decryption key sent with the digital information. Accordingly, a first step performed by the processor of the host system is to detect the type of decryption key sent with the digital information. (Block 240). This step may alternatively be performed by detecting data sent with the digital information identifying the encryption scheme employed.

Second, the processor decrypts the digital information to yield the compressed information sent by the provider. (Block 250). Decryption is performed based on the type of decryption key detected by the processor in the previous step, or alternatively based on the type of encryption scheme detected. Decryption and encryption may be performed using any of a number of conventional methods. One exemplary method is known as the Data Encryption Standard. Another is called the Advanced Encryption Scheme. Those skilled in the art can appreciate that these schemes are merely illustrative of the invention and that if desired various other methods may be used.

Third, once the digital information is decrypted, it is decompressed by the processor to yield the original digital information sent by the provider. (Block 260). Thus, for example, if the digital information sent by the provider is an MPEG file, the file may be subjected to an appropriate decoding scheme to recover the audiovisual information originally sent from the provider. If the information is a JPEG or text file, known techniques for decompressing data of this type may be used.

Fourth, once the digital information is recovered in its decrypted and uncompressed form, it is "rendered" to the user. (Block 270). This rendering step includes having the processor execute an application program (e.g., media player, MP3 player, text reader, etc.) to output the information to a user.

The processor of the host system performs at least one of the third and fourth steps in accordance with the predetermined control data stored in the memory unit. According to one aspect of the invention, the control data includes a table which stores a correspondence between one or more types of decryption keys and the quality with which the digital information is to be reproduced to the user. Reproduction quality may be determined by controlling the extent and/or manner of decompression, the extent and/or manner of the rendering, or both. Specific schemes for controlling reproduction quality will be described in greater detail below.

According to another aspect of the invention, the control data may define a correspondence between one or more types of decryption keys and a limitation on the time the digital information is available for reproduction to the user. According to still another aspect of the invention, the control data may define a correspondence between one or more types of decryption keys and both the time and quality of reproduction of the digital information. Preferred embodiments of the method for controlling the access and reproduction of digital information in accordance with the present invention will now be discussed.

A Preferred Embodiment

Figure 3:
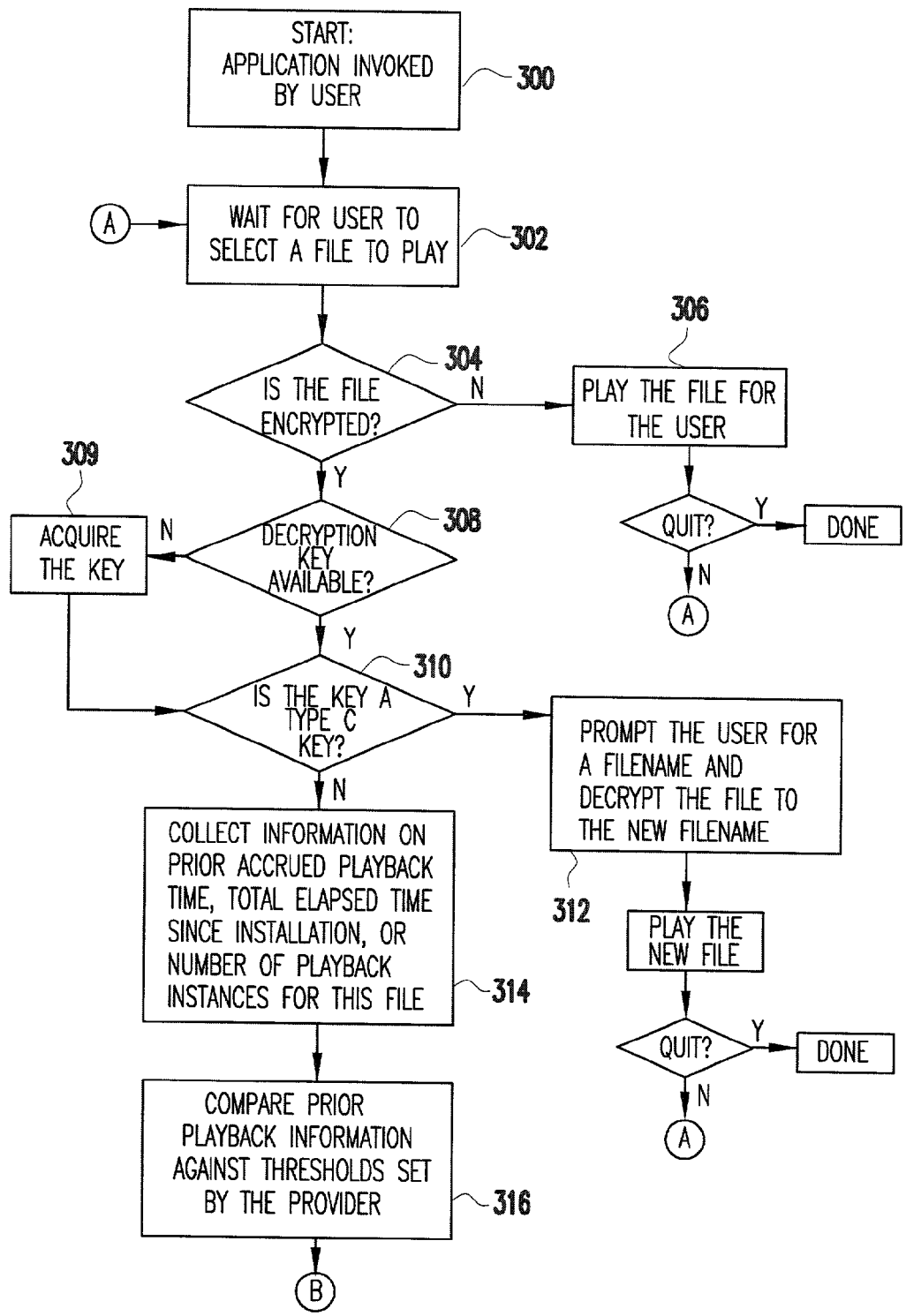
FIG. 3 is a flow diagram showing steps included in a preferred embodiment of the method of the present invention.

Referring to FIG. 3, a preferred embodiment of the method of the present invention begins when a user of the host system invokes an application program for reproducing media files. (Block 300). The user then selects a file to play. (Block 302). For convenience purposes, the application program will be referred to as a media player and the file will be referred to as a media file. The media file may advantageously be a movie, image, or audio file or any other type of digital information obtained from a provider, for example, through a network such as the Internet. Alternatively, the file may be from a computer-readable medium sent by the provider. As a further alternative, the media file may be sent to the user tied to the media player application. Under these circumstances, both the media file and player application would be stored on the host system at the same time. One advantage to having the media file copied to the host system memory (e.g., hard drive) is that the file may be updated, e.g., new keys embedded, playback information could be stored there, etc. Alternatively, the media file would not be copied to the host system. Under these circumstances, the media file would always be read from the media (e.g., CD) on which it was delivered.

The media file preferably includes an embedded decryption key which allows only temporary access to the user when reproduced by the application program. Alternatively, the decryption key may be made available upon request from an executable file via, for example, a network or some place other than the host system., in which case the media player application would not be tied to the media file.

In accordance with this embodiment, the media player application is written with code that controls the quality of reproduction of media files based on the type of decryption key sent or otherwise obtained in association with the files. This code is written to effect a progressive degradation in the quality of reproduction of a file based on the passage of time, the number of times the file is played back, or a combination of the two. For example, to control reproduction quality in this manner, a table may be programmed into the application code which indicates any one or more of the following:

| Decryption Key | Reproduction Quality |
|---|---|
| A | Progressive degradation |
| B | Degradation after time condition |
| C | Restriction on Access Removed/ Permanent decryption/Full Quality Reproduction |

The above table indicates that if a type A decryption key is sent with the media file, the media player application will progressively degrade the reproduction quality of the file after the file is played. If a type B decryption key is sent with the media file, the media player will not degrade the quality of reproduction until a time condition has been satisfied. The time condition may, for example, correspond to a predetermined number of times the file has been played on the media player, e.g., 5 plays of a movie, 3 viewings of an image. The time condition may also correspond to the aggregate time the file has been viewed over multiple playing or viewing periods, e.g., the user gets a total of 15 minutes viewing the file, whether the file is viewed one time or twenty times. Further, the time condition may correspond to the length of time the file has been viewed during any one playing period. In this latter situation, for example, the user may only be permitted to view the file for two minutes at any one time, or after two minutes the quality of the file reproduction quality may steadily worsen, or over the entire viewing period the file reproduction quality may steadily worsen. The time condition may also be a combination of the above, e.g., the media player application may progressively degrade the reproduction quality of the file has been played a predetermined number of times.

The time condition may also correspond to absolute time. This situation may be implemented, for example, by comparing date information embedded in the media file sent by the provider with the date identified by the operating system of the host computer. When the dates match, the media file may be allowed to be reproduced in its severely degraded state, or access to the file may be altogether denied. An absolute time condition based on the time the media player application program was installed on the host system may also be used.

The application program code may also be written to control the extent of reproduction quality degradation. For example, quality may be degraded just to a point where there is slight degradation (e.g., where coloration of the images are altered), or substantial or complete degradation may be effected (e.g., a scrambling effect or even a dark screen).

If a type C decryption key is sent with the media file, then the media player application reproduces the file without any quality degradation. More specifically, a type-C key will instruct the media player application to permanently decrypt the media file and disable any protection (e.g., reproduction quality degradation schemes) that may have previously been applied in association with this file, including those associated with the A- and B-type decryption keys discussed above. After these steps have been taken, the media file may be copied or propagated to others without restriction. This type of key is useful, for example, in connection with the business method embodiment of the invention, where the user paid a fee in order to obtain permanent ownership and use of the media file.

Returning to FIG. 3, once a user has selected a file, the media player application determines whether the file is encrypted. (Block 304). If not, the file is played for the user and the method ceases until another file selection is made. (Block 306). On the other hand, if the file is decrypted the media player application next determines whether a decryption key is available. (Block 308). If not, the application acquires the key by searching the file for key information. (Block 309).

Key acquisition may be accomplished in a variety of ways. According to one exemplary approach, the media player application may determine whether a file is encrypted or not by the presence of a tag at the head of a file. This could be removed upon permanent (e.g., Type-C) decryption. Also, it is noted that architected standards such as MPEG data files begin with predictable headers. If, in examining an MPEG file, the header is correct, it has already been decrypted, otherwise it is considered encrypted.

Secondly, the decryption key(s) may be delivered and stored in various ways. One way is to actually embed the key(s) in the media file. The MPEG standard allows for insertion of "private data" or "user data." This is a syntactical allowance in the standard so that a party may attach (by embedding) non-MPEG data to an MPEG stream. This data would be ignored by an MPEG decoder. Therefore, in this case the keys are really inside the file, i.e., there is no file attachment.

Alternatively, the key(s) could be placed in a completely separate file. This file could have, for example, a name and location of the customer's choosing, so that the customer would known where to find it. As a further alternative, the key(s) may be embedded in the application, just as other program data. A further approach involves storing critical data in a place designated for such use by the operating system. For example, the Windows operating system has an entity called the "registry", which is used by the operating system but any application may add to, delete from, or read registry information (commonly referred to as "keys" or "values"). Keys might not be stored on the host system at all, but instead may be always dynamically fetched from a network. In this latter situation, the playback function of the media player is subordinate to the network being functional and responsive.

If the key is available or once the key is acquired, steps are performed to determine what type of decryption key is associated with the file. (Block 310). If the media player application determines that the key is a type which permits the media file to be played without any reproduction quality degradation (e.g., type C above), the user may, for example, be prompted on a display of the host system to provide a new filename for the file. (Block 312). The file may then be decrypted and stored to the new filename, after which the file may be played and the application closed. Alternatively, the media player application may automatically play the file once it has been determined that the decryption key associated with the file is type C.

If the media player application determines that the key is a type which warrants reproduction quality degradation, then the application accesses predetermined control information to determine under what conditions quality degradation will occur. (Block 314). The control information may be stored in a host system memory, embedded in distributed media, included within the media file itself, or even stored in the code used for the media player application such as when the application was tied to the media file and sent to the user. The control information may even be stored on a remote system linked to the host system via, for example, a network.

The control information in the form of history information and/or predetermined key correlations may be redundantly stored for purposes of performing a confirmation check. For example, the media player application or host system processor may access this control information and then the media file would be reproduced only if this history information satisfied a predetermined criteria. If the criteria were not satisfied, tampering may be inferred and the media player application may refuse to reproduce the media file. (Tamper-resistant schemes contemplated within the scope of the invention are discussed in greater detail infra.) As a further modification, if the media file is stored on a writable medium in read-only mode, the media player application may refuse to reproduce the media file.

This control information may indicate any of the types of reproduction quality degradation previously discussed. For example, the control information may indicate that on the first playback, the file is to be reproduced without reproduction quality degradation, but that every playback thereafter a progressive degradation will be performed. This type of key corresponds to type A previously discussed. Under these conditions, the media player application may be equipped with a counter which counts the number of playbacks to control the extent reproduction quality is degraded.

The control information may alternatively indicate that the degradation is to be performed after a predetermined number (e.g., 3) of undegraded playbacks. This type of key corresponds to type B discussed above.

The control information may further be of a type which indicates that degradation is to be performed after a total elapsed time since the media player application was installed on the host system, which may be achieved by the system date comparison previously discussed. This type of degradation is suitable, for example, when the media player application is downloaded to the user with the media file.

In all the foregoing embodiments, the threshold conditions for controlling reproduction quality degradation (e.g., time conditions, numbers of playbacks, etc.) are set by the media provider, and comparisons are made with respect to this information before playback. (Block 316). Those skilled in the art can appreciate that the specific conditions discussed above, while beneficial, are merely illustrative and that other conditions may by set for controlling reproduction quality in accordance with the present invention.

Figure 4:
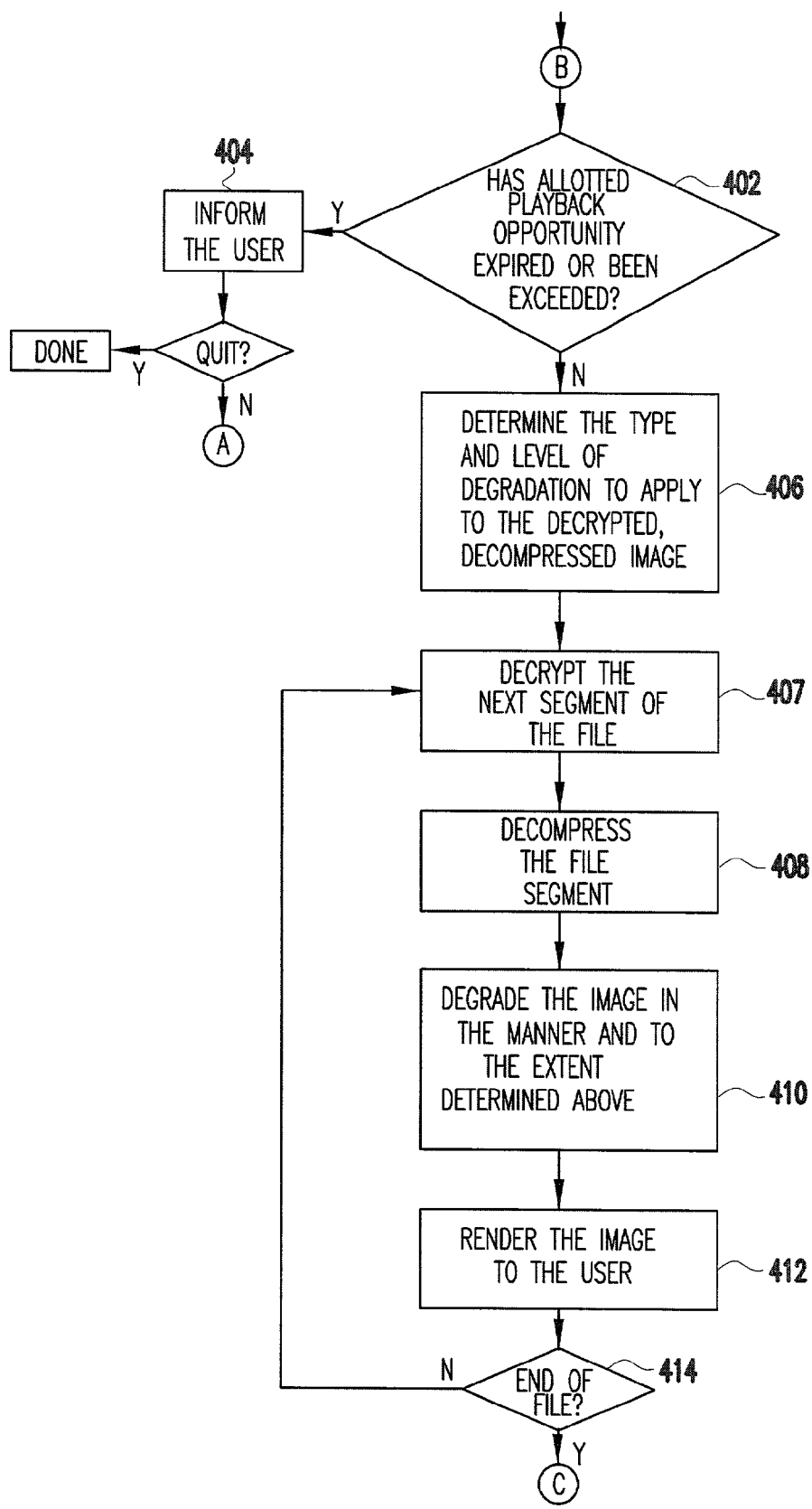
FIG. 4 is a flow diagram showing additional steps included in a preferred embodiment of the method of the present invention.

Referring to FIGS. 3 and 4, the method continues with the media player application identifying the threshold conditions for controlling reproduction quality degradation (Block 316), and if applicable (e.g., if the condition is an absolute condition), determining whether the conditions have expired or been exceeded. (Block 402). For example, in this latter instance, the threshold condition may be a time limit of only three playbacks, after which the media player will not reproduce the media file at all. Under these circumstances, the media player may output a predetermined message indicating that the user is not entitled to any more playbacks and that he or she should contact the provider concerning the purchase of a permanent media file. (Block 404).

If the threshold conditions have not expired or been exceeded, the media player application determines the type and level of degradation to apply in the reproduction. (Block 406). This step is performed based on the type of decryption key detected and the control information stored in system memory corresponding to that type of decryption key. Decryption then takes place in accordance with the decryption key. (Block 407).

Reproduction quality degradation may be performed in at least three ways in accordance with the present invention. First, the manner in which the media file is decompressed may be controlled to degrade the reproduction quality of the media file. For example, in the case of MPEG data, the quantization matrices may be altered to produce less than optimal visual results. This may involve assigning values to levels of color (chrominance) and brightness (luminance) to 16×16 pixel blocks (called "macroblocks") during MPEG decoding. Additionally, or alternatively, the MPEG difference data could be intentionally altered during macroblock reconstruction. For example, difference data could be halved or reduced or increased by some fixed amount or percentage. Once decompression has occurred in this manner, the media file may be rendered in a normal manner, i.e., without taking any additional steps to degrade the reproduction.

Second, the manner in which the media file is rendered may be controlled to degrade the reproduction quality of the media file. Under these circumstances, decompression occurs normally (i.e., without taking steps to degrade reproduction quality—see Block 408), but then steps are taken to alter one or more display parameters for the media file (Block 410). These steps include, for example, the following: limiting dimensional resolution, interpolating pixels, limiting colorspace, altering pixel components (luminance and/or chrominance, or red/green/blue coefficients), adding or subtracting a delta to the pixel components, replacing some pixels with white or black space or space of another color, artificially restricting the granularity of numbers used to represent visual data, and adding an overlay (e.g., a watermark or other design) to the image. In this latter case, the overlay may be made more prominent and thus may be made more obtrusive with time or with the number of viewings.

Once these parameters have been altered, the media file is output with the intended quality degradation. (Block 412). As previously discussed, progressive degradation may be performed based on, for example, a time condition and may be effected by steadily worsening one or more of the aforementioned parameters with each additional playback.

Third, reproduction quality degradation may be controlled by altering both the decompression and rendering of the media file in any one or more of the above-mentioned ways. All of these ways are preferably performed after the media file is decrypted in accordance with decryption software stored in the media player application, or elsewhere in the memory of the host system. If desired, and for example, in the case of large MPEG files, the media file may be degraded in quality on a segment-by-segment basis. In this case, the processes would loop back to distort a next segment after a previous segment was output, for example, on the host system display. (Block 414).

In addition to the foregoing features, the media player application may be programmed to operate with different levels of decryption keys. For example, the player may operate in accordance with a succession of key level, where each key level provides, for example, higher-quality viewing, more viewing iterations, or a different level of functionality with respect to viewing. In accordance with the business method embodiment of the invention, the user may be charged different prices for each level of key. For example, the key levels may be selected to allow a user to access a different type or amount of information in the file (e.g., different amounts or types of images, bodies of data, etc.). As an example, a relatively inexpensive key may be purchased to allow the user to access only the most general information in the file. More expensive keys may then be purchased to allow a user to access more specific information, the reproduction of which may be degraded over time or with use in accordance with the quality-degradation schemes of the present invention.

Figure 5:
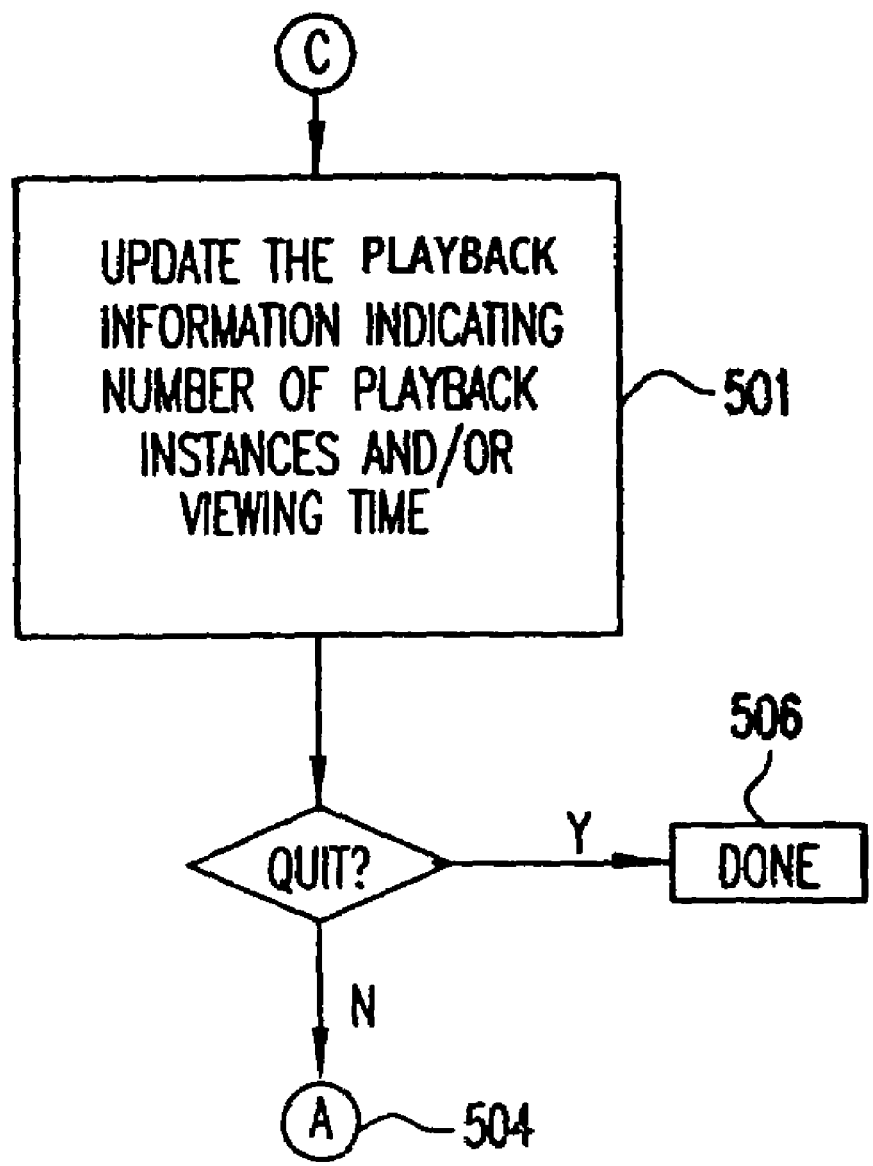
FIG. 5 is a flow diagram showing additional steps included in a preferred embodiment of the method of the present invention.

Referring to FIG. 5, after the media file is rendered with the intended reproduction quality degradation, the media player application updates the control information stored in the application or system memory, if applicable. For example, if the decryption key is a type which indicates that reproduction quality is to degrade based on a number of playbacks and/or viewing time, the media file updates the counters accordingly. (Block 501). The media file may then be immediately replayed (this time, for example, in a further degraded state), Block 504, or the application may be closed, Block 506.

Encryption

The method of the present invention encrypts media files so that they may be decrypted using multiple decryption keys, e.g., types A through C discussed above. One exemplary way in which this encryption may be performed will now be described.

An encryption/decryption scheme is symmetric if, using an encryption algorithm and a key "x," the same algorithm is applied to the encrypted data, also using key "x," to decrypt it. Sometimes, the decryption steps are inverted from the encryption steps, but the same key is used for both. Many useful encryption schemes are symmetric in this sense. U.S. Pat. No. 6,083,316 discloses a mathematical basis for deriving the exact decryption key "x" from different pairs of numbers. One number may optionally be provided by a user, and for example may correspond to a credit card number, a computer system "fingerprint", or even a meaningless random number.

From this number, called a user number (n), the provider, via an authorization center, executes an algorithm on the user number which is capable of producing multiple authorization numbers. In accordance with the present invention, one or multiple authorization numbers may be given to a specific customer. The authorization number/user number together may be used to calculate the ultimate decryption key, "x." This pair is likened to a digital signature, thus it may be termed a signet pair. The authorization number/user number pair may also be thought of as the decryption key, rather than "x" itself. By taking this approach, multiple decryption keys (e.g., signet pairs) may be used to identically decrypt one set of data.

Additionally, it is noted that the user number does not really have to come from the user. Instead, the provider could generate a user number for a customer (randomly chosen, perhaps) from which multiple authorization numbers would be generated. Mathematical characteristics may then be assigned to different authorization numbers to place them into classes (e.g., different classes might be odd, even, evenly divisible by 3, not evenly divisible by 3, contains more "5" digits than "3" digits, etc.). Thus, in accordance with one aspect of the invention, what the media player application would really be observing are the properties of the authorization numbers, e.g., to what class does the authorization number belong. (This may be what the media player may use to determine whether a key is a Class A key, Class B key, etc. and therefore what level of restricted access or degradation (if any) to apply.) Accordingly, in accordance with this exemplary embodiment of the invention, it may be said that digital information is decrypted using more than one signet pair to generate the actual decryption key "x."

Any of the authorization numbers (along with the user number) is sufficient to calculate the decryption key "x," which always allows full and total decryption. However, the application determines what authorization number was used, classifies it, and uses that class to determine if and how to reproduce the data. If desired, the authorization numbers and/or user numbers may be quite large (e.g., hundreds of digits).

This scheme may be modified in various ways. For example, while an arbitrary user number may be chosen for one customer, a software utility may alternatively be provided that runs on the customer's PC. This utility may observe some of the characteristics of the system which may, individually or together, prove somewhat unique (like serial numbers, for instance). Then, the utility may generate a number from these characteristics. In this regard, the system fingerprint number may be the user number. Under these circumstances, once that number has been authorized, the playback application can perform the same calculations as the utility to reproduce the fingerprint (or user) number at will. Thus, what results is a decryption scheme that is tied to that exact system and would fail if run on any other system.

Circumvention/Tamper Resistance

Any software which accesses proprietary data may be the target of so-called "hackers." Hackers are computer experts who attempt to access sensitive data, disrupt the stability of a computer system, and/or circumvent software protection mechanisms (such as product key entry) so that they may use software without authorization or without paying for it. Various approaches for circumvention/tamper-resistance may advantageously be implemented in order to prevent the integrity of the system and method of the present invention from being compromised.

One approach involves using tamper-resistant software to recognize when a debugger or other hacking tool is being used to prevent the host (e.g., media player) application from functioning properly. If the application detects the presence of a debugger, it may refuse to function properly.

The provider may modify the application after compilation, such that some subset of code and/or data (which is necessary for normal functioning) is encrypted. Furthermore, this encryption may be based on some "fingerprint" or properties of the host system. The fingerprint may be derived from readily accessible, relatively unique, and reproducible information from the host system. When invoked, the application would examine the host system properties, reproduce a fingerprint, and decrypt its crucial block (or blocks) of code or data. If the finger print is wrong (e.g., the software has been ported to a different system), the decryption of the crucial code or data will produce erroneous results, which will cause the application to fail to function properly. These features are described in greater detail below.

Figure 6:
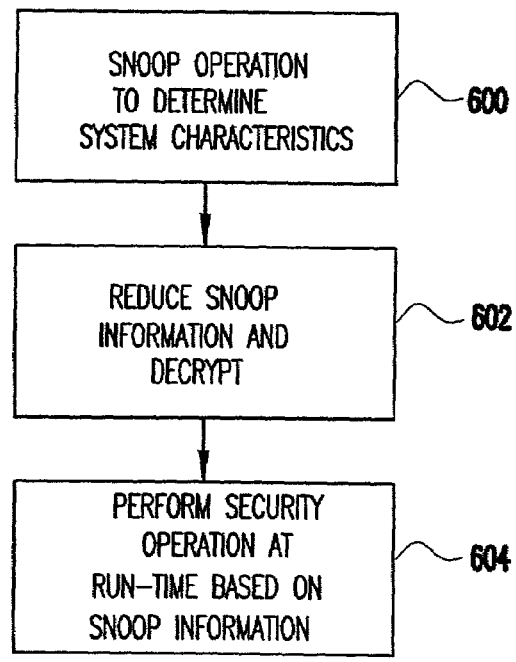
FIG. 6 is a flow diagram showing one exemplary way of making the method of the present invention tamper-resistant.

Referring to FIG. 6, in order to use tamper-resistant software, the provider of a media file may be required to inquire in advance about one or more characteristics of the host system. This may be performed using a program which "snoops" the system and collects information corresponding to these characteristics, e.g., the make and model of the hard (C:) drive, the machine's serial number, etc. (Block 600). The information may then be reduced to a manageable size and used to decrypt part of the code or data of the application. (Block 602). The information may be reproduced by the application at run-time, and if the information changes, implying that a different system is being used, the program may be disabled so that it will not function. (Block 604).

One possible way a hacker might circumvent this file protection scheme is to initially make a copy of the media file/media player application bundle, and then use that copy to reinstall the media player application on a new system. Copying this bundled information ensures that any changes the installation or viewing process may make to the original will not be propagated. This, however, requires the user to have access to multiple systems.

Figure 7:
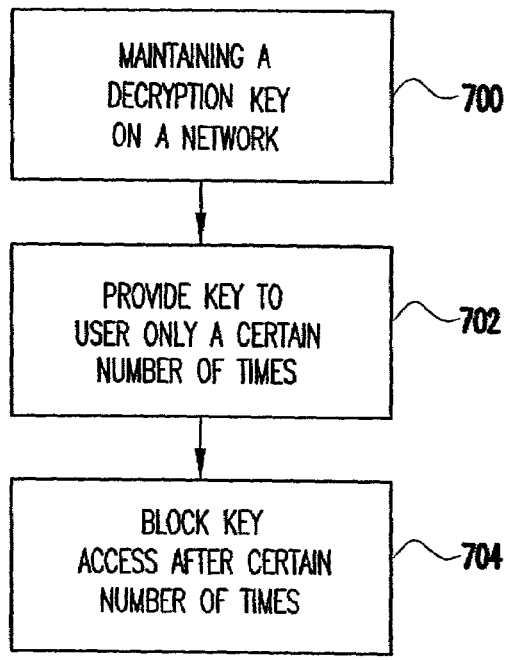
FIG. 7 is a flow diagram showing another exemplary way of making the method of the present invention tamper-resistant.

Referring to FIG. 7, circumvention may be prevented under these circumstances by remotely maintaining a decryption key, for example, on a network (Block 700). The key may then be provided to the user only a predetermined number of times. (Block 702). This may be accomplished, for example, by requiring the user to enter a password at a network website and then having the website software count the number of user accesses made. Once the predetermined number of accesses have been counted, the website software blocks any subsequent attempts by that user to obtain the key. (Block 704).

Another approach involves having a remote system/website "tag" the host system to ensure that subsequent requests for the key are coming from the same source. Such a tag may take the form of an internet "cookie," for example. Alternatively, the software may be tailored in advance to a specific system, as described above.

Another form of circumvention involves capturing the media files when they are "in the clear," i.e., in decrypted form. For example, a JPEG image displayed to a computer monitor is no longer encrypted or compressed. A user can easily capture and record the contents of the screen, for example, to a bitmap file. The disadvantage here is that this can be time-consuming, and also substantially larger images may result since they are no longer compressed. (Bitmaps may be compressed, however some loss of quality will result, and at the user's discretion the provider of the images may never have been rendered at full resolution in the first place without a type-C key, as discussed above.) In the case of MPEG video, data in uncompressed form would quickly become unmanageable in size.

Images are also "in the clear" when stored in system memory after decryption but before degradation. In order to capture these images, an intimate knowledge of the system (i.e., hacking ability) beyond the ability of most users would be required. In the case of motion video, which is constantly changing, capturing "in the clear" data would present an even greater challenge. Additionally, a prospective buyer of a media file may attempt to uninstall the media player application from his or her system, then reinstall it, hoping for a fresh start with the maximum number of viewings.

In accordance with the present invention, if the required decryption key is fetched from a remote location, the remote location may refuse to provide the key more than once, defeating the foregoing circumvention approaches. Further, upon installation, the application may "tag" the system with some piece of data, or evidence of its presence which is not removed during the uninstall process. During installation, the installation software checks for the existence of this tag and installation fails if it is found.

A sophisticated user may also attempt to hack the application software at its decision points—patching or tricking the software into thinking that a type-C (see above) decryption key is present when it is not. Various degrees of tamper resistance, as described above, may be added to prevent this breach of protection.

A further precaution in accordance with the present invention is to employ an installation procedure which "snoops" one or more presumably permanent attributes of the system, such as the make and model of the hard (C:) drive, in the case where the host system is a personal computer, or a machine serial number, and return that data to the remote location at which the decryption key is stored, as well as leave a copy of the data on the system, perhaps in the form of a cookie which can be read over the network. In this case, whenever the decryption key is fetched over the network, the data in the cookie on the user's system must match the data returned at installation time, or else it would be apparent that a different system would be in use. Under these circumstances, the decryption key would not be transmitted.

Tracking a total elapsed time since the time when the media player application was installed may commonly depend on the time and date maintained by the system itself. Unfortunately, this is generally easily changed by the user. Therefore, where total elapsed time is tracked, the invention may be directed to fetch the current time and date over a network.

Figure 8:
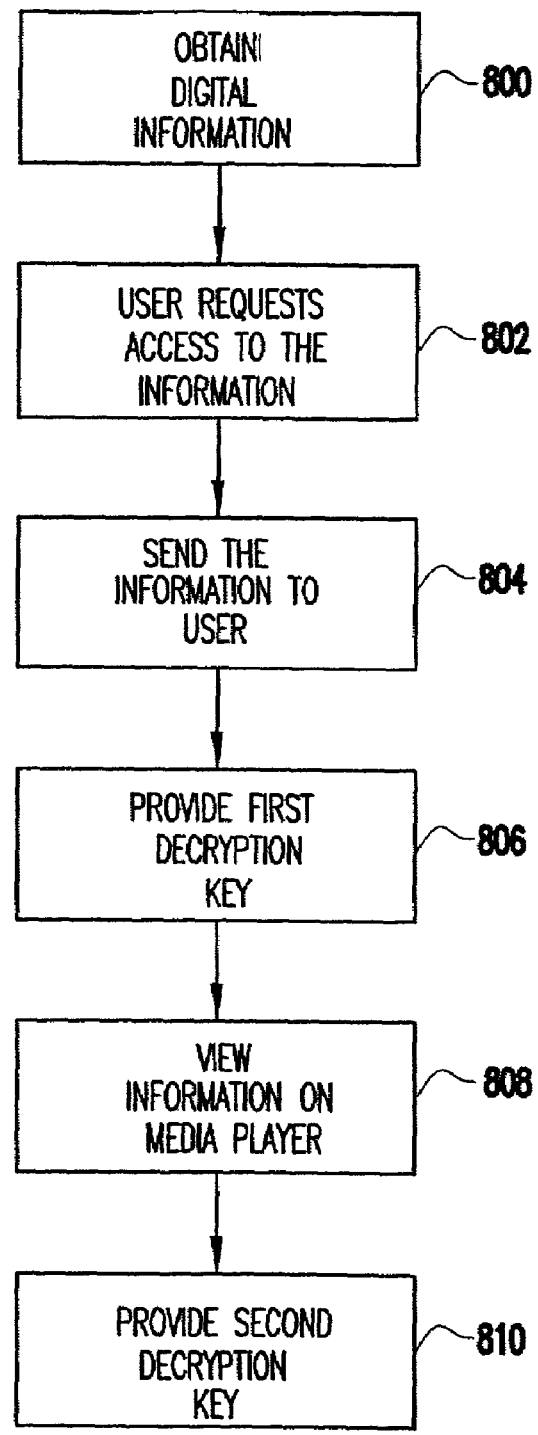
FIG. 8 is a flow diagram showing steps included in the business method of the present invention.

Referring to FIG. 8, an embodiment of the business method of the present invention begins with a media provider capturing, scanning, or otherwise obtaining digital information of interest to a user. (Block 800). The digital information may be in the form of one or more image, audiovisual/movie, or text files which, for example, may be personalized in nature (e.g., family pictures) or simply of interest to the user and/or his business.

In a second step, the user requests access to the digital information obtained by the media provider. (Block 802). The user may request access in any of variety of conventional ways including by telephone, via a network (e.g., website), or by mail. If the media provider is local, the user may even personally request the information from the provider.

In a third step, the media provider sends all or a portion of the requested digital information to the user in an encrypted and compressed format. (Block 804). Delivery may be accomplished in various ways. For example, the information may be sent to the user as an attachment to an e-mail, or the information may be downloaded to the user through a network site. As a security measure to the user, network access may be predicated upon the user entering a password or other identifying information. Alternatively, the digital information may be mailed or handed to the user on a computer-readable medium (e.g., a compact disk). The digital information may be provided in sample form (e.g., only one of ten requested images may be provided) or in its entirety.

Access to the digital information may be predicated on some form of payment by the user. For example, the media provider may send the digital information to the user for an initial fee, in order to allow the user to view the information for a trial period. Payment may be made by credit card or any other conventional method. If desired, the information may be provided free of charge as an incentive to the user to pay full price.

In a fourth step, a decryption key is made accessible to the user in order to enable the digital information to be displayed on the host system. (Block 806). This key may be embedded in the media file itself, sent electronically to the user via e-mail, or made accessible to the user on the media provider's website. If the digital information is electronically conveyed to the user tied to a media player application, the decryption key may be embedded in the code of the media player application. Furthermore, if the user obtained the media player application from another source (e.g., the application was downloaded by the user from another website or was originally installed on the host system), the key may be located and used by the media player application in accordance with any of a variety of known techniques.

One way in which the media player application may locate and then use the decryption key when the key is not tied to the media player application involves using a third-party media player to look for keys in predetermined places. If keys are embedded in the media files, the player would have to scan those files looking for a predictable header or tag indicating that keys follow. Or, the keys could be stored in a file of a predetermined name or location. Or, as previously mentioned, the keys could be stored in an operating system construct such as a registry. The player could even prompt the user to enter the keys manually.

The decryption key initially sent to the user is preferably one of the A- or B-type decryption keys previously discussed. Controlling access to the digital information based on such a key advantageously allows the user to temporarily view at least a sample of the digital information, thereby providing an incentive to the user to pay full price for permanent access. At the same time, the keys protect the media provider's profit margin by denying the user permanent access should he decide not to pay full price.

In a fifth step, the user views the digital information on the media player. (Block 808). The ability to view this information is restricted in accordance with the initial decryption key. For example, if a type-A decryption key is used, the media player application will progressively degrade the reproduction quality of the information each time the information is viewed. As the quality degrades, the user will be forced to make a decision on whether to pay the full price in order to permanently receive the digital information requested.

In a sixth step, a second type of decryption key is sent to the user when the user pays the full price for the digital information. (Block 810). The second type of decryption key corresponds to the type-C key previously discussed. This key instructs the media player application to permanently decrypt the media file and disable any protection (e.g., reproduction quality degradation schemes) that may have previously been applied in association with this file, including those associated with the A- and B-type decryption keys. (If only a sample of the digital information was sent, the media provider now provides the requested digital information to the user in its entirety.) After these steps have been taken, the media file may be copied or propagated to others without restriction.

An optional step of the business method of the present invention involves, sending an intermediate decryption key to the user. This type of key is suitable for use when only a portion of the digital information is sent to the user. For example, if the digital information is a document, it may be initially sent to the user with vital portions obliterated (e.g., white space). The reproducible portions of the document enable the user to make a decision as to whether to pay full price. If, however, the user wants to reserve this decision pending an examination of additional portions of the document (e.g., pictures which were whited-out from the information initially sent), the media provider may provide, free or for a fee, an intermediate type of decryption key which will instruct the media player to reveal only one or more of the pictures in the document. Access to remaining vital portions may still be restricted. The final type-C key may then be purchased upon review of the pictures.

The business method of the present invention is advantageous in a number of respects. For example, in accordance with one embodiment the customer may always have the entirety of the requested material within his or her possession. Once a purchase is made, the provider is only required to provide a key to the user. This makes purchase and permanent access of the digital information convenient for both the customer and the provider. Further, by sending only a key, the provider does not have to re-send the material or maintain multiple copies of the material in its various forms of degradation, since the media player application on the customer system performs this degradation. As a result, the provider's computer system storage requirements are substantially reduced. Furthermore, circumvention/tamper-resistant techniques in accordance with the invention may be employed to protect the integrity of the information provided. Advantageously, the level of tamper-resistance may be varied depending on the type of customer and/or the sensitivity or value of the information sent.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

I claim:

1. A method for controlling access to digital information, comprising:
    storing digital information in an encrypted form on a host system;
    reproducing the digital information using a media player application on the host system, said reproducing step including degrading a reproduction quality of the digital information based on at least one of a time condition and a use condition;
    storing data on the host system which correlates a first type of decryption key with a first type of reproduction quality degradation performed based on at least one of said time condition and said use condition;
    storing said first type of decryption key on the host system; and
    comparing said first type of decryption key to the data stored on the host system to identify said first type of reproduction quality degradation,
    wherein said reproducing step includes degrading the reproduction quality of the digital information in accordance with the first type of reproduction quality degradation identified in said comparing step.

2. The method of claim 1, further comprising:
    storing additional data on the host system which correlates a second type of decryption key with information which indicates that the digital information is to be reproduced without degradation in quality;
    storing said second type of decryption key on the host system; and
    comparing said second type of decryption key to the additional data stored on the host system,
    wherein said reproducing step includes reproducing the digital information on said media player application without degradation in quality based on said additional data comparing step.

3. The method of claim 2, wherein said information which indicates that the digital information is to be reproduced without degradation in quality instructs said media player application to permanently prevent the first type of reproduction quality degradation indicated by said first type of decryption key.

4. The method of claim 1, wherein said reproducing step includes degrading the reproduction quality of the digital information by altering a decompression of the digital information.

5. The method of claim 1, wherein said reproducing step includes degrading the reproduction quality of the digital information by altering a rendering of the digital information.

6. The method of claim 1, wherein the host system is one of a personal computer, a personal digital assistant, and a digital set-top box.

7. The method of claim 1, wherein the media player application includes tamper-resistant software.

8. A method for controlling access to digital information, comprising:
    acquiring digital information for reproduction on a host system;
    sending the digital information to the host system with a first decryption key, said first decryption key instructing an application program on the host system to degrade the reproduction quality of the digital information based on at least one of a time condition and a use condition.

9. The method of claim 8, further comprising:
    receiving information from a user of the host system, said information indicating a desire to have unrestricted access to the digital information; and
    sending a second decryption key to the host system, said second decryption key instructing the application program to reproduce the digital information without degradation in quality.

10. The method of claim 9, wherein said second decryption key instructs the application program to reproduce the digital information without degradation.

11. The method of claim 10, further comprising:
defining a pricing structure wherein said second decryption key is priced higher than said first decryption key.

12. The method of claim 8, wherein said first decryption key instructs the application program to degrade the reproduction quality of the digital information by altering a decompression of the digital information.

13. The method of claim 8, wherein said first decryption key instructs the application program to degrade the reproduction quality of the digital information by altering a rendering of the digital information.

14. The method of claim 8, wherein said sending step includes:
sending the application program with the digital information and said first decryption key.

15. The method of claim 14, wherein the application program performs a tamper-resistance function when executed on the host system.

16. The method of claim 14, further comprising:
storing data in the application program which correlates said first decryption key with a first type of reproduction quality degradation performed based on at least one of said time condition and said use condition, wherein the application program performs the first type of reproduction quality degradation when executed on the host system.

17. The method of claim 16, further comprising:
storing additional data in the application program which correlates a second decryption key with information indicating that the digital information is to be reproduced by the application without degradation in quality; and
sending said second decryption key to the host system,
wherein said application program compares said second decryption key to said additional data and then reproduces the digital information without degradation in quality.

18. The method of claim 17, wherein said second decryption key instructs the application program to permanently prevent the reproduction quality degradation of the digital information performed by said first decryption key.

19. The method of claim 16, further comprising:
storing additional data in the application program which correlates a second decryption key with a second type of reproduction quality degradation, said second type of reproduction quality degradation being less severe than the first type of reproduction quality degradation;
sending said second decryption key to the host system,
wherein said application program compares said second decryption key to said additional data and then reproduces the digital information with said second type of reproduction quality degradation.

20. A method for controlling access of digital information, comprising:
storing digital information in an encrypted form on a host system;
reproducing said digital information, using a first decryption key, a first time with a first quality of reproduction, and
reproducing said digital information a second time, using a second decryption key, with a second quality of reproduction, said second quality of reproduction being degraded relative to said first quality of reproduction.

21. A method for controlling access of digital information, comprising:
storing digital information in an encrypted form on a host system;
storing an application program for reproducing the digital information on the host system;
storing a first decryption key on the host system;
activating the application program to reproduce the digital information on the host system, said application program reproducing the digital information based on said first decryption key, said first decryption key controlling said application program to reproduce only a portion of the digital information; and
storing a second decryption key on the host system,
wherein said application program reproduces the digital information a second time based on said second decryption key, said second decryption key controlling said application program to reproduce all of the digital information.

* * * * *